US008830848B1

(12) United States Patent
Shetty et al.

(10) Patent No.: US 8,830,848 B1
(45) Date of Patent: Sep. 9, 2014

(54) ADJUSTING A CONTROL CHANNEL TIMER IN A WIRELESS COMMUNICATION (75) Inventors: Manoj Shetty, Overland Park, KS (US); Anoop Kumar Goyal, Overland Park, KS (US); Sachin R. Vargantwar, Overland Park, KS (US); Siddharth S. Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 740 days.

(21) Appl. No.: 12/963,714

(22) Filed: Dec. 9, 2010

(51) Int. Cl.
*G01R 31/08* (2006.01)
*H04B 3/20* (2006.01)
*H04W 68/00* (2009.01)

(52) U.S. Cl.
USPC ............................ 370/252; 370/389; 455/458

(58) Field of Classification Search
USPC .......................................... 370/389; 455/458
See application file for complete search history.

(56) References Cited

U.S. PATENT DOCUMENTS

| 6,738,617 | B2 | 5/2004 | Rosen et al. |
| 6,912,401 | B2 | 6/2005 | Rosen et al. |
| 7,099,629 | B1 | 8/2006 | Bender |
| 7,342,901 | B1 | 3/2008 | Zhang et al. |
| 7,570,961 | B2 | 8/2009 | Rajkotia et al. |
| 7,761,122 | B2 | 7/2010 | HomChaudhuri |
| 7,796,995 | B2 | 9/2010 | Gill et al. |
| 2005/0288049 | A1 | 12/2005 | Gill et al. |
| 2006/0109846 | A1* | 5/2006 | Lioy et al. ...................... 370/389 |
| 2006/0172747 | A1* | 8/2006 | Mohammed ................... 455/458 |

* cited by examiner

Primary Examiner — Ian N Moore
Assistant Examiner — Kiet Tang (57) ABSTRACT

Systems and methods are disclosed herein for adjusting a control channel timer based on control communication traffic on a control channel. In a particular embodiment, a method provides exchanging data packets with a wireless network over a wireless traffic channel assigned to a wireless device. The method further provides monitoring control communications from the wireless network over a wireless control channel and adjusting a control channel timer that indicates a time period that the wireless device should continue to monitor the control communications based on a level of control communication traffic. The method further provides releasing the assigned traffic channel in response to the expiration of a dormancy timer. In response to the release of the traffic channel, the method provides starting the control channel timer. In response to the expiration of the control channel timer, the method provides stopping the monitoring of the control communication traffic.

16 Claims, 5 Drawing Sheets

ADJUSTING A CONTROL CHANNEL TIMER IN A WIRELESS COMMUNICATION

TECHNICAL BACKGROUND

Wireless devices, such as cellular phones and mobile Internet appliances, communicate with wireless communication networks via access nodes, such as base stations. The wireless communications between the wireless devices and the network occur using frequencies in the radio frequency (RF) band of the electromagnetic spectrum. Some communications, such as user voice and data communications, typically use a traffic channel, while control communications from the wireless network typically use a control channel.

Due to limited RF spectrum, access nodes may have a limited number of traffic channels to allocate to connected wireless devices. Thus, when a wireless device is no longer exchanging communications with the wireless access node, the network may release the traffic channel from the wireless device, so that the traffic channel may be allocated to other wireless devices. In some cases, the wireless device may continue to monitor the control channel after the traffic channel is released. Continuing to monitor the control channel allows another traffic channel to be allocated faster than if the wireless device stopped monitoring the control channel.

Overview

Systems and methods are disclosed herein for adjusting a control channel timer based on control communication traffic on a control channel. In a particular embodiment, a method provides exchanging data packets with a wireless communication network over a wireless traffic channel assigned to a wireless communication device by the wireless communication network. The method further provides monitoring control communications from the wireless communication network over a wireless control channel and adjusting a control channel timer that indicates a time period that the wireless communication device should continue to monitor the control communications based on a level of control communication traffic. The method further provides releasing the assigned traffic channel in response to the expiration of a dormancy timer, wherein the dormancy timer indicates when a wireless traffic channel in the wireless communication network that is assigned to the wireless communication device should be released. In response to the release of the traffic channel, the method provides starting the control channel timer. In response to the expiration of the control channel timer, the method provides stopping the monitoring of the control communication traffic from the wireless communication network.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
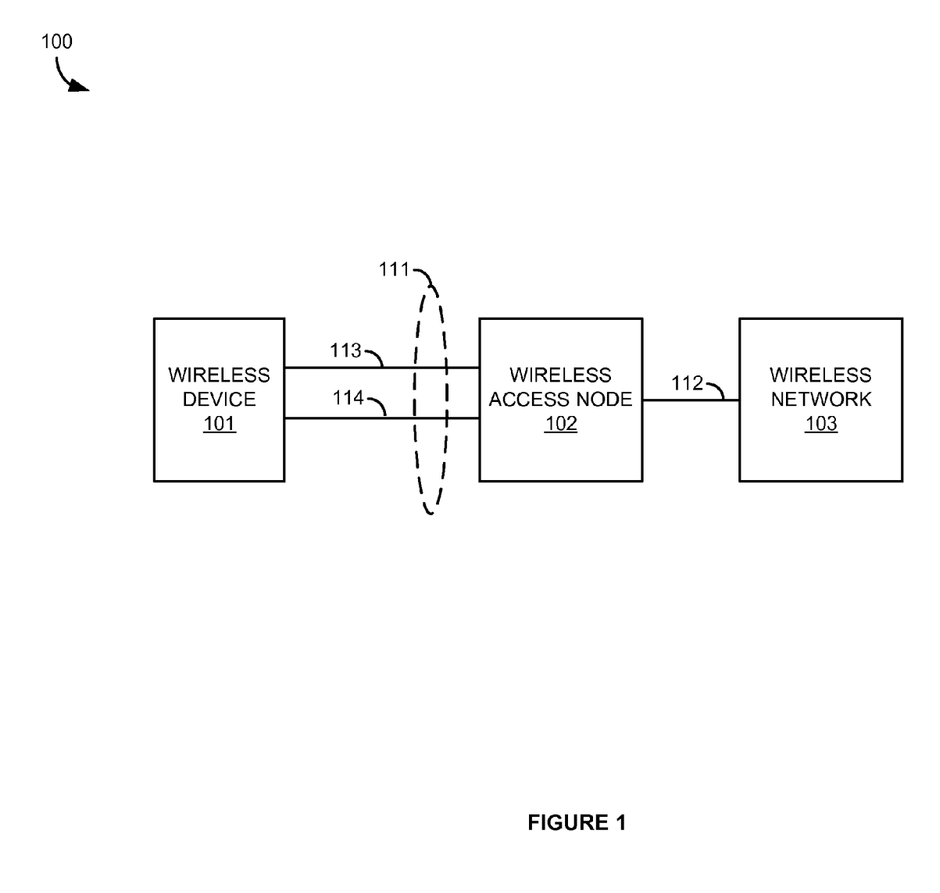
FIG. 1 illustrates a wireless communication system for adjusting a control channel timer in a wireless device.

FIG. 1 illustrates wireless communication system 100. Wireless communication system 100 includes wireless communication device 101, wireless access node 102, and wireless communication network 103. Wireless communication device 101 and wireless access node 102 communicate over wireless link 111. Wireless access node 102 and wireless communication network 103 communicate over communication link 112. Wireless link 111 includes traffic channel 113 and control channel 114.

In operation, wireless device 101 may use multiple communication channels on wireless link 111 to exchange communications with access node 102. The communication channels include traffic channel 113 and control channel 114. Traffic channel 113 is only used by wireless device 101 when assigned to wireless device 101, but other wireless devices communicating with access node 102 also use control channel 114. Access node 102 may have a limited number of traffic channels that may be assigned to wireless devices. Consequently, traffic channel 113 may only be assigned to wireless device 101 during times when wireless device 101 requires a traffic channel to exchange communications. After a time that no packets are exchanged on traffic channel 113, traffic channel 113 may be released from wireless device 101 so that it can be assigned to other wireless devices.

After traffic channel 113 is released, wireless device 101 continues to monitor control channel 114 to receive control communications from access node 102 and wireless network 103, such as a traffic channel assignment. Additionally, wireless device 101 maintains another timer that controls the amount of time that wireless device 101 should continue to monitor control channel 114. Wireless device 101 may continue to monitor control channel 114 because a traffic channel may be assigned for further packet traffic more quickly while control channel 114 is being monitored without having to wake from an idle state to read control channel 114. Once the timer expires, wireless device 101 stops monitoring control channel 114 and enters an idle state. Consequently, wireless device 101 no longer uses the resources of wireless device 101 to monitor control channel 114.

Figure 2:
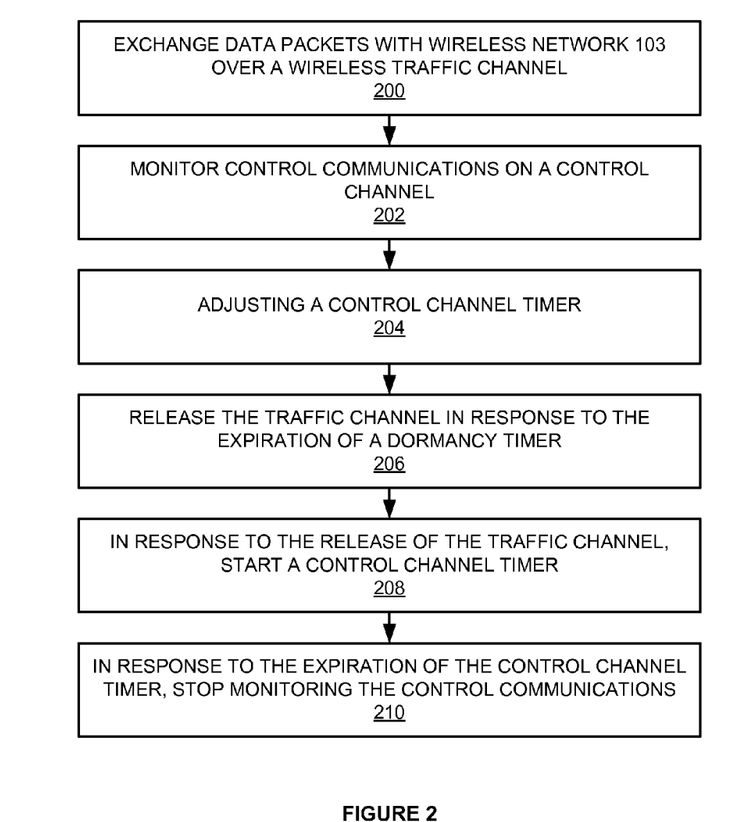
FIG. 2 illustrates the operation of a wireless communication system to adjust a control channel timer in a wireless device.

FIG. 2 illustrates the operation of wireless communication system 100. Wireless device 101 exchanges data packets with wireless network 103 over wireless traffic channel 113 assigned to wireless device 101 by wireless network 103 (step 200). The data packets may be for any type of packet communications to or from wireless device 101. For example, an application executing on wireless device 101 may exchange data packets from a system located on wireless network 103 or some other communication network, such as the Internet.

Wireless device 101 monitors control communications from wireless network 103 over wireless control channel 114 (step 202). The control communications may be any type of communications that control how wireless device 101 exchanges communications with access node 102 or wireless network 103. For example, if wireless device 101 was not already assigned traffic channel 113 on access node 102, then the control communications will indicate a traffic channel assignment for wireless device 101 when packet communications are to be exchanged with wireless device 101. As part of the monitoring of the control communication traffic, wireless device 101 monitors the level of control communication traffic on control channel 114, which is also known as control channel occupancy. The level of control communication traffic may be the volume of overall traffic on control channel 114 or the volume of control traffic destined for wireless device 101.

Wireless device 101 adjusts a control channel timer that indicates a time period that wireless device 101 should continue to monitor the control communications after traffic channel 113 is released based on a level of control communication traffic (step 204). The control channel timer may be adjusted to be longer, shorter, or may stay the same length. For example, the length of the control channel timer may be decreased based on high control channel occupancy. Higher control channel occupancy may indicate high communication load on access node 102 or wireless network 103. Consequently, a shorter control channel timer allows for control communications of wireless device 101 to get off control channel 114 sooner in order to reduce resource usage on wireless device 101, such as battery and CPU cycles of wireless device 101. Likewise, the length of the control channel timer may be increased base on low control channel occupancy.

Alternatively, the control channel timer may be increased based on high control channel occupancy. High control channel occupancy may indicate that there are more control messages on control channel 114 that need to be acknowledged by the wireless devices to which the messages are directed. Hence, increasing the control channel timer in wireless device 101 increases the chance that wireless device 101 will acknowledge control messages directed to wireless device 101 on control channel 114. Acknowledging control messages quicker helps to ease congestion on control channel 114.

In other examples, the control channel timer may be increased if there is a high amount of control communication traffic directed to wireless device 101. A high amount of control communication traffic directed to wireless device 101 may indicate that wireless device 101 has a higher probability of needing a traffic channel in the near term. Additionally, as stated above, it may be desirable with more control traffic directed at wireless device 101 for wireless device 101 to monitor control channel 114 longer in order to acknowledge control messages. Similarly, the control channel timer may be decreased if there is a low amount of control communication traffic directed to wireless device 101. In some examples, the overall control channel occupancy and the control channel occupancy directed at wireless device 101 may be balanced in order to determine the proper adjustment to the control channel timer.

In some embodiments, wireless device 101 may further balance the resources of wireless device 101, such as the battery power required for wireless device 101 to continue monitoring control channel 114 and the desire of a user to receive a traffic channel more quickly when using wireless device 101 along with the control channel occupancy considerations from above when adjusting the control channel timer.

In some embodiments, wireless device 101 may receive a user input that indicates a preference by the user for the length of the control channel timer. The user preference may then override the control channel timer adjustment or may be factored into the calculation for the adjustment along with the control channel occupancy. For example, the user may want wireless device 101 to be able to get a traffic channel faster, therefore the user may indicate that wireless device 101 should continue to monitor the control channel longer. The user may desire that the control channel be monitored longer during web browsing. This would allow for a traffic channel to be assigned quicker when a user requests a new web page before the control channel timer expires.

Traffic channel 113 is then released in response to the expiration of a dormancy timer, wherein the dormancy timer indicates when a wireless traffic channel in the wireless communication network that is assigned to wireless device 101 should be released (step 206). The dormancy timer may be started after each packet exchanged between access node 102 and wireless device 101. Therefore, if no more packets are exchanged before the expiration of the dormancy timer, then traffic channel 113 is released. However, if more packets are received before the expiration of the dormancy timer, then the dormancy timer may be restarted and traffic channel 113 is retained. The dormancy timer may be located in wireless device 101, access node 102, wireless network 103, or some combination thereof. For example, access node may release traffic channel 113 for wireless device 101 upon expiration of the dormancy timer and inform wireless device 101 of the traffic channel release over the control channel.

In response to the release of traffic channel 113, wireless device 101 starts the control channel timer (step 208). Then, in response to the expiration of the control channel timer, wireless device 101 stops the monitoring of the control communication traffic from the wireless network 103 (step 210). Therefore, control channel 114 continues to be monitored by wireless device 101 for the amount of time governed by the control channel timer after the release of traffic channel 113. Wireless device 101 may inform access node 102 or wireless network 103 that control channel 114 is no longer being monitored by wireless device 101. The control channel timer may be ignored if wireless device 101 is allocated another traffic channel over control channel 114 before the control channel timer expires. The control channel timer will then be restarted upon release of that traffic channel. Similarly, the control channel timer may continue to be adjusted based on control communication traffic.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless communication network 103 comprises network elements that provide wireless devices with wireless communication access to packet communication services. Wireless network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
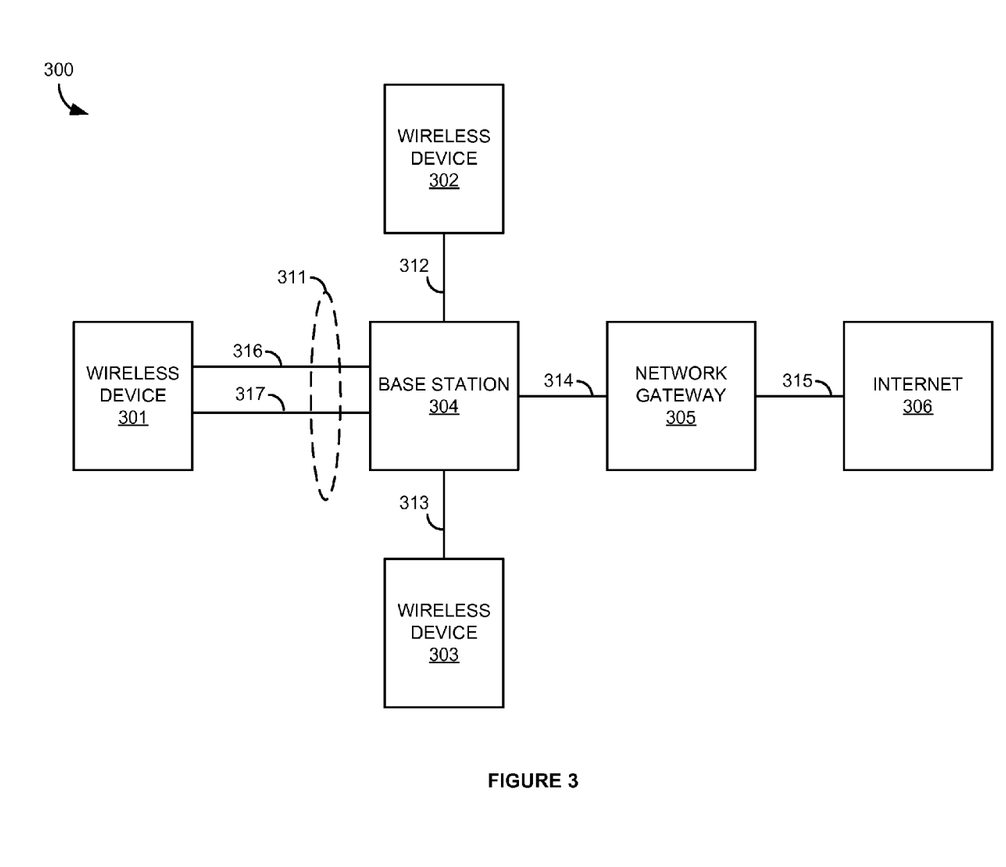
FIG. 3 illustrates a wireless communication system for adjusting a control channel timer in a wireless device.

FIG. 3 illustrates wireless communication system 300. Wireless communication system 300 includes wireless communication devices 301-303, base station 304, network gateway 305, and Internet 306. Wireless communication devices 301-303 and base station 304 communicate over wireless links 311-313, respectively. Base station 304 and network gateway 305 communicate over communication link 314. Network gateway 305 and Internet 306 communicate over communication link 315. Wireless link 311 includes traffic channel 316 and control channel 317. Though not shown, wireless links 312 and 313 may also include these two channels.

In operation, wireless device 301 exchanges packet communications with Internet 306 via base station 304 and network gateway 305. The packet communications may be for an application executing on wireless device 301. For example, the application may be a web browser on wireless device 301. Wireless device 301 may be assigned a traffic channel with base station 304 when the web browser or any other application on wireless device 301 needs to exchange packets with other systems and devices via base station 304.

Figure 4:
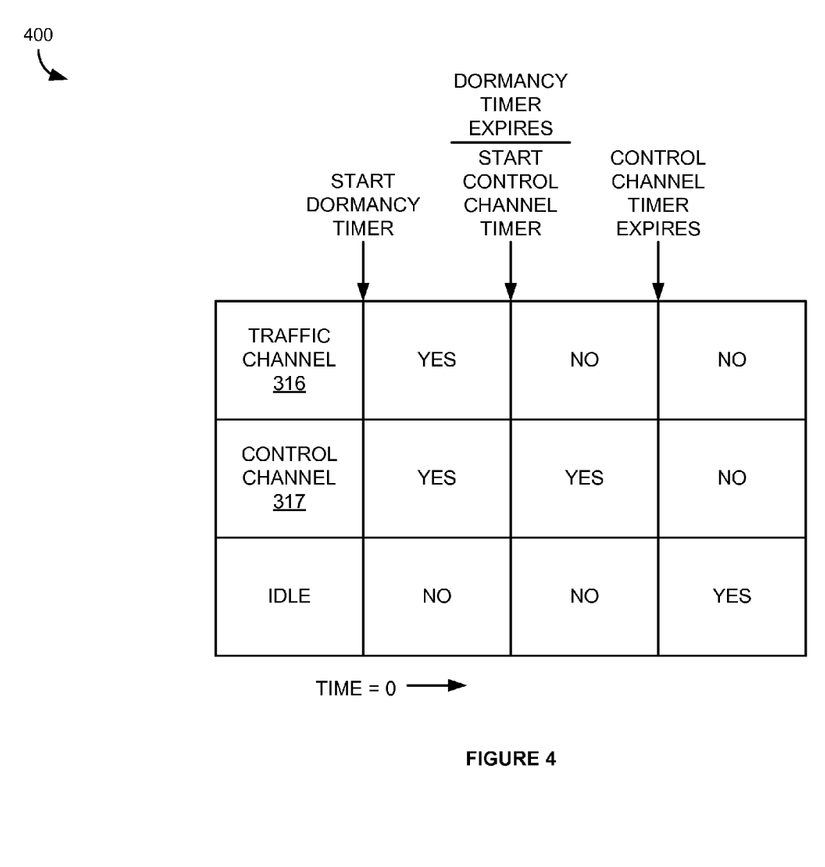
FIG. 4 is a time table illustrating the operation of a wireless communication system to adjust a control channel timer in a wireless device.

FIG. 4 illustrates timetable 400 that illustrates the sequence of channel use on wireless link 311 when wireless device 301 exchanges packet communications with base station 304. After wireless device 301 receives the final packet in a packet stream, then a dormancy timer is started. For example, after the web browser in wireless device 301 receives a web page, then packets are no longer sent to wireless device 301. Although other applications on wireless device 301 could still exchange packets over traffic channel 316, for the purposes of simplicity the web browser will be the only application executing on wireless device 301 for this example. The dormancy timer may be located in wireless device 301, base station 304, network gateway 305, or some combination thereof.

Timetable 400 indicates that at the time that the dormancy timer is started wireless device is still assigned traffic channel 316 and monitors control channel 317. Before the dormancy timer expires, a user of wireless device 301 may request another web page. The packets exchanged between wireless device 301 and base station 304 over traffic channel 316 to request and load the web page restart the dormancy timer. Therefore, traffic channel 316 stays assigned to wireless device 301 because wireless device 301 exchanges data frequently enough to maintain the traffic channel assignment.

Once the dormancy timer does expire, traffic channel 316 is released from wireless device 301 the traffic channel can be reassigned to wireless device 302 or 303. Time table 400 indicates that when the dormancy timer expires traffic channel 301 can no longer be used by wireless device 301 but wireless device 301 continues to monitor control channel 317. Additionally, timetable 400 indicates that wireless device 301 starts a control channel timer.

The control channel timer may vary in length depending on control channel occupancy for control channel 317. Before starting the control channel timer, wireless device 301 monitors control communications on control channel 317 to determine a level of control communications being transferred on control channel 317. The level of control channel communications indicates the control channel occupancy. Wireless device 301 may monitor all control communications on control channel 317, including control communications directed to wireless devices 302 and 303. Additionally or alternatively to monitoring all control communications on control channel 317, wireless device 301 may monitor the control communications directed to wireless device 301. Wireless device 301 may then adjust the length of the control channel timer in accordance with the determined control channel occupancy.

Wireless device 301 may continually or periodically adjust the control channel timer based on changes to the control channel occupancy of control channel 317. Wireless device 301 may make adjustments to the control channel timer at any point while wireless device 301 is monitoring control channel 317. Wireless device 301 may adjust the control channel timer while the control channel timer is running in order to use the adjusted control channel timer when and if the control channel timer is restarted. Likewise, the length of the running control channel timer may be adjusted as the control channel timer runs in order to keep the timer length current. Alternatively, wireless device may only adjust the control channel timer while traffic channel 316 is still active and before the control channel timer is started.

A user input from the user of wireless device 301 may further modify the control channel timer. For example, the user may desire that the web pages requested by the web browser in wireless device 301 load faster. Therefore, the user may indicate that the control channel timer should be longer in order to increase the possibility that wireless device 301 will receive a traffic channel faster and thereby load the requested web page faster.

If wireless device 301 either transfers or receives a control message on control channel 317 that requests a traffic channel before the control channel timer expires, then traffic channel 316 is reassigned to wireless device 301. Consequently, the control channel timer is no longer needed until traffic channel 316 is once again released and the control channel timer is restarted. Traffic channel 316 that is reassigned to wireless device 301 may be the same traffic channel as previously assigned to wireless device 301 or may be a different traffic channel on base station 304.

For example, the user may indicate that a new web page should load in the web browser of wireless device 301. Wireless device 301 uses control channel 317 to request a traffic channel on base station 304 in order to transfer the page request and receive the web page from Internet 306. Once the new page is finished loading, the dormancy timer is started again. Then, once the dormancy timer expires, traffic channel 316 is released and the control channel timer is started with the current adjusted length of the control channel timer.

Once the control channel timer expires, wireless device 301 stops monitoring control channel 317 for control communications. Consequently, wireless device 301 enters an idle state where resources of wireless device 301 are conserved by not having to continually monitor control channel 317. At this point, if a traffic channel is needed by wireless device 301 to transfer packets, wireless device 301 must start monitoring control channel 317 before requesting a new traffic channel.

Figure 5:
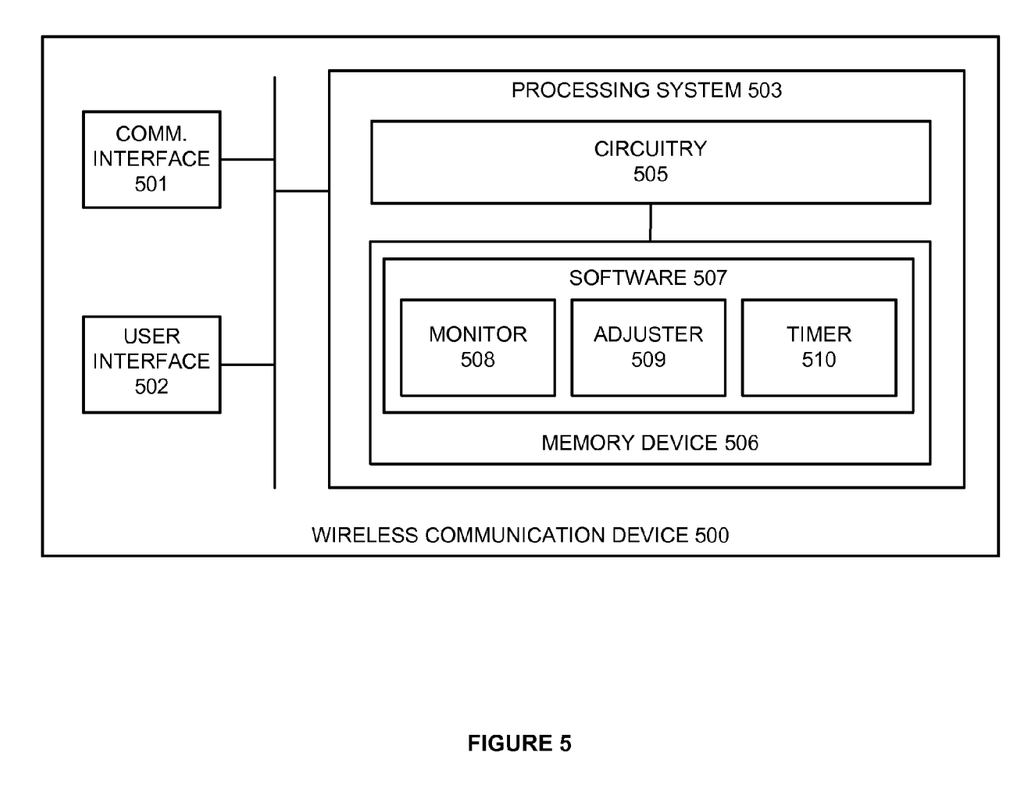
FIG. 5 illustrates a wireless communication device for adjusting a control channel timer in the wireless device.

FIG. 5 illustrates wireless communication device 500. Wireless communication device 500 is an example of wireless communication devices 101 and 301, although devices 101 and 301 could use alternative configurations. Wireless communication device 500 comprises wireless communication interface 501, user interface 502, and processing system 503. Processing system 503 is linked to wireless communication interface 501 and user interface 502. Processing system 503 includes processing circuitry 505 and memory device 506 that stores operating software 507. Operating software 607 includes monitoring software module 608, timer adjustment software module 609, and control channel timer software module 610. Wireless communication device 501 may include other well-known components such as a battery and enclosure that are not shown for clarity. Wireless communication device 501 may be a telephone, computer, e-book, mobile Internet appliance, media player, game console, wireless network interface card, or some other wireless communication apparatus—including combinations thereof.

Wireless communication interface 501 comprises RF communication circuitry and an antenna. The RF communication circuitry typically includes an amplifier, filter, RF modulator, and signal processing circuitry. Wireless communication interface 501 may also include a memory device, software, processing circuitry, or some other communication device. Wireless communication interface 501 may use various protocols, such as CDMA, EVDO, WIMAX, GSM, LTE, WIFI, HSPA, or some other wireless communication format. Wireless communication interface 501 is configured to exchange data packets with a wireless communication network over a wireless traffic channel and monitor control communications from the wireless network on a control channel.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Processing circuitry 505 is typically mounted on a circuit board that may also hold memory device 506 and portions of communication interface 501 and user interface 502. Operating software 507 comprises computer programs, firmware, or some other form of machine-readable processing instructions. Operating software 607 includes monitoring software module 608, timer adjustment software module 609, and control channel timer software module 610. Operating software 507 may also include an operating system, utilities, drivers, network interfaces, applications, or some other type of software. When executed by processing circuitry 505, operating software 507 directs processing system 503 to operate wireless communication device 500 as described herein.

In particular, wireless communication interface 501 exchanges data packets with a wireless communication network over a wireless traffic channel assigned to the wireless communication device by the wireless communication network. Monitoring software module 508 directs processing system 503 to monitor control communications received in wireless communication interface 501 from the wireless communication network over a wireless control channel. Timer adjustment software module 509 adjusts a control channel timer that indicates a time period that the wireless communication device should continue to monitor the control communications based on a level of control communication traffic. Wireless communication interface 501 releases the assigned traffic channel in response to the expiration of a dormancy timer, wherein the dormancy timer indicates when a wireless traffic channel in the wireless communication network that is assigned to the wireless communication device should be released. In response to the release of the traffic channel, control channel timer software module 510 starts the control channel timer. In response to the expiration of the control channel timer, monitoring software module 508 stops the monitoring of the control communication traffic from the wireless communication network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
    exchanging data packets with a wireless communication network over a wireless traffic channel assigned to the wireless communication device by the wireless communication network;
    monitoring control communications from the wireless communication network over a wireless control channel;
    adjusting a control channel timer that indicates a time period that the wireless communication device continues to monitor the control communications based on a level of control communication traffic, wherein adjusting the control channel timer comprises increasing and decreasing the time period based on increases in occupancy of control communication traffic on the wireless control channel;
    releasing the assigned traffic channel in response to the expiration of a dormancy timer, wherein the dormancy timer indicates when to release a wireless traffic channel in the wireless communication network that is assigned to the wireless communication device;
    in response to the release of the traffic channel, starting the control channel timer; and
    in response to the expiration of the control channel timer, stopping the monitoring of the control communication traffic from the wireless communication network.

2. The method of claim 1 further comprising receiving user input and wherein adjusting the control channel timer is further based on the user input.

3. The method of claim 2 wherein the user input indicates a longer time period of the control channel timer.

4. The method of claim 2 wherein the user input indicates a shorter time period of the control channel timer.

5. The method of claim 2 wherein the user input overrides any adjustment based on the control communication traffic.

6. The method of claim 1 wherein the control communication traffic comprises the control channel traffic directed to the wireless communication device.

7. The method of claim 6 wherein adjusting the control channel timer further comprises increasing the time period based on increases in occupancy of control communication traffic directed to the wireless communication device on the wireless control channel.

8. The method of claim 1 wherein the wireless communication network is a code division multiple access protocol.

9. A wireless communication device comprising:
a wireless communication interface configured to exchange data packets with a wireless communication network over a wireless traffic channel assigned to the wireless communication device by the wireless communication network and monitor control communications from the wireless communication network over a wireless control channel, release the assigned traffic channel in response to the expiration of a dormancy timer, wherein the dormancy timer indicates when to release a wireless traffic channel in the wireless communication network that is assigned to the wireless communication device;
a processing system configured to adjust a control channel timer that indicates a time period that the wireless communication device continues to monitor the control communications based on a level of control communication traffic by increasing and decreasing the time period based on increases in occupancy of control communication traffic on the wireless control channel, in response to the release of the traffic channel, starting the control channel timer, and in response to the expiration of the control channel timer, stopping the monitoring of the control communication traffic from the wireless communication network.

10. The wireless communication device of claim 9 further comprising a user interface configured to receive user input and wherein the processing system is configured to adjust the control channel timer further based on the user input.

11. The wireless communication device of claim 10 wherein the user input indicates a longer time period of the control channel timer.

12. The wireless communication device of claim 10 wherein the user input indicates a shorter time period of the control channel timer.

13. The wireless communication device of claim 10 wherein the user input overrides any adjustment based on the control communication traffic.

14. The wireless communication device of claim 9 wherein the control communication traffic comprises the control channel traffic directed to the wireless communication device.

15. The wireless communication device of claim 14 wherein the processing system is further configured to adjust the control channel timer by increasing the time period based on increases in occupancy of control communication traffic directed to the wireless communication device on the wireless control channel.

16. The wireless communication device of claim 9 wherein the wireless communication network is a code division multiple access protocol.

* * * * *